United States Patent [19]

Takahashi

[11] Patent Number: 5,548,655
[45] Date of Patent: Aug. 20, 1996

[54] SOUND PROCESSING APPARATUS

[75] Inventor: Katsunori Takahashi, Hokkaido, Japan

[73] Assignee: Hudson Soft Co., Ltd., Hokkaido, Japan

[21] Appl. No.: 122,942

[22] Filed: Sep. 20, 1993

[30] Foreign Application Priority Data

| Oct. 1, 1992 | [JP] | Japan | 4-284988 |
| Oct. 1, 1992 | [JP] | Japan | 4-284989 |
| Oct. 1, 1992 | [JP] | Japan | 4-284990 |
| Oct. 7, 1992 | [JP] | Japan | 4-293768 |

[51] Int. Cl.$^6$ ................................................. H03G 3/00
[52] U.S. Cl. .................. 381/104; 381/118; 381/107; 84/633; 84/665; 84/625; 84/660
[58] Field of Search ........................ 84/645, 625, 660, 84/633, 665; 381/120, 61, 118, 104, 109, 107

[56] References Cited

U.S. PATENT DOCUMENTS

| 3,796,945 | 3/1974 | Feldman et al. ............... 381/104 |
| 4,475,228 | 10/1984 | Vickers ............................ 381/51 |
| 4,611,344 | 9/1986 | Hayama et al. .................. 381/109 |
| 4,677,890 | 7/1987 | Yannes ............................ 84/1.19 |
| 4,771,671 | 9/1988 | Hoff, Jr. .......................... 84/645 |
| 4,926,485 | 5/1990 | Yamashita ....................... 381/107 |
| 4,933,980 | 6/1990 | Thompson ....................... 381/61 |
| 5,054,359 | 10/1991 | Hikawa ........................... 84/645 |
| 5,054,360 | 10/1991 | Lisle et al. ...................... 84/645 |
| 5,142,959 | 9/1992 | Sakamoto et al. ............... 84/645 |
| 5,225,618 | 7/1993 | Wadhams ........................ 84/645 |

OTHER PUBLICATIONS

ISD 1016 Series, Single Chip Voice Message System, Preliminary Specification (Aug. 1991).

*Primary Examiner*—Forester W. Isen
*Attorney, Agent, or Firm*—Lowe, Price, LeBlanc & Becker

[57] ABSTRACT

A sound processing apparatus has a volume control circuit for controlling sound volume and a register storing plural values specifying attenuation levels. The register values are determined to linearly correspond to the rate of change of the attenuation level.

10 Claims, 15 Drawing Sheets

FIG. 1 PRIOR ART

| ATTENTUATION | | REGISTER VALUE |
|---|---|---|
| TOTAL VALUE | DIFFERENCE VALUE | |
| - 1dB | 1dB | 7 |
| - 2dB | 1dB | 6 |
| - 3dB | 1dB | 5 |
| - 4dB | 1dB | 4 |
| - 6dB | 2dB | 3 |
| - 8dB | 2dB | 2 |
| - 10dB | 2dB | 1 |
| - 12dB | 2dB | 0 |

FIG. 4

| ATTENTUATION | | |
|---|---|---|
| TOTAL VALUE | DIFFERENCE VALUE | REGISTER VALUE |
| - 1dB | 1dB | 11 |
| - 2dB | 1dB | 10 |
| - 3dB | 1dB | 9 |
| - 4dB | 1dB | 8 |
| - 6dB | 2dB | 7, 6 |
| - 8dB | 2dB | 5, 4 |
| - 10dB | 2dB | 3, 2 |
| - 12dB | 2dB | 1, 0 |

FIG. 5

| D7 | D6 | D5 | D4 | D3 | D2 | D1 | D0 |
|----|----|----|----|----|----|----|----|
| USED | | RST ADPCM #2 | RST ADPCM #1 | INTER-POLATION #2 | INTER-POLATION #1 | D1V1 | D1V1 |

FIG. 6

VOLUME REGISTER

| D7 | D6 | D5 | D4 | D3 | D2 | D1 | D0 |
|----|----|----|----|----|----|----|----|
| UNUSED | | ADPCM #1 VOL L5 | ADPCM #1 VOL L4 | ADPCM #1 VOL L3 | ADPCM #1 VOL L2 | ADPCM #1 VOL L1 | ADPCM #1 VOL L0 |
| UNUSED | | ADPCM #1 VOL R5 | ADPCM #1 VOL R4 | ADPCM #1 VOL R3 | ADPCM #1 VOL R2 | ADPCM #1 VOL R1 | ADPCM #1 VOL R0 |
| UNUSED | | ADPCM #2 VOL L5 | ADPCM #2 VOL L4 | ADPCM #2 VOL L3 | ADPCM #2 VOL L2 | ADPCM #2 VOL L1 | ADPCM #2 VOL L0 |
| UNUSED | | ADPCM #2 VOL R5 | ADPCM #2 VOL R4 | ADPCM #2 VOL R3 | ADPCM #2 VOL R2 | ADPCM #2 VOL R1 | ADPCM #2 VOL R0 |

FIG. 7A

CONTROL REGISTERS (1)

| 7 | 6 | 5 | 4 | 3 | 2 | 1 | 0 |
|---|---|---|---|---|---|---|---|
|   |   |   |   |   | DIV1 | READ EN#2 | READ EN#1 |
|   |   |   |   | DIV1 | BUF HALF#1 | BUF END#1 | RING BUF#1 |
|   |   |   |   |   | BUF HALF#2 | BUF END#2 | RING BUF#2 |

| 9 | 8 | 7 | 6 | 5 | 4 | 3 | 2 | 1 | 0 | |
|---|---|---|---|---|---|---|---|---|---|---|
| -A/B | KA16 | KA15 | KA14 | KA13 | KA12 | KA11 | KA10 | KA9 | KA8 | #1 |
| -A/B | KA16 | KA15 | KA14 | KA13 | KA12 | KA11 | KA10 | KA9 | KA8 | #2 |

KA0 - KA7 = 00H FIXED

FIG. 7C (4)

| 9 | 8 | 7 | 6 | 5 | 4 | 3 | 2 | 1 | 0 | |
|---|---|---|---|---|---|---|---|---|---|---|
| -A/B | KA16 | KA15 | KA14 | KA13 | KA12 | KA11 | KA10 | KA9 | KA8 | #1 |
| -A/B | KA16 | KA15 | KA14 | KA13 | KA12 | KA11 | KA10 | KA9 | KA8 | #2 |

KA0 - KA7 = FFH FIXED

FIG. 7D (5)

| 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|---|---|---|---|---|---|---|---|---|---|
| -A/B | KA16 | KA15 | KA14 | KA13 | KA12 | KA11 | KA10 | KA9 | KA8 | KA7 | KA6 | KA5 | KA4 | KA3 | KA2 | KA1 | KA0 |
| -A/B | KA16 | KA15 | KA14 | KA13 | KA12 | KA11 | KA10 | KA9 | KA8 | KA7 | KA6 | KA5 | KA4 | KA3 | KA2 | KA1 | KA0 |

UPPER #1, LOWER #2

FIG. 7E (6)

| 7 | 6 | 5 | 4 | 3 | 2 | 1 | 0 |
|---|---|---|---|---|---|---|---|
|   |   |   |   | SOUND HALF#2 | SOUND END#2 | SOUND HALF#1 | SOUND END#1 |

FIG. 8

| | REGISTER | | D7 | D6 | D5 | D4 | D3 | D2 | D1 | D0 |
|---|---|---|---|---|---|---|---|---|---|---|
| (1) | R0 | CHANNEL SELECT | | | | | | | ch SEL | |
| (2) | R1 | MAIN VOLUME ADJ | | LMAL | | | | RMAL | | |
| (3) | R2 | FREQUENCY FINE ADJ | | FRQ LOW | | | | | | |
| (4) | R3 | FREQUENCY ROUGH ADJ | | | | | | FRQ HIGH | | |
| (5) | R4 | CHAIN ON DDA CHAN-VOLUME | ch ON | DDA | | AL | | | | |
| (6) | R5 | L,R VOLUME | | LAL | | | | RAL | | |
| (7) | R6 | WAVE FORM | | | | WAVE DATA | | | | |
| (8) | R7 | NOISE ENABLE NOISE FREQ | NE | | | NOISE FRQ | | | | |
| (9) | R8 | LFO FREQUENCY | | LFO FRQ | | | | | | |
| (10) | R9 | LFO CONTROL | LF TRG | | | | | | LF CTL | |

FIG. 9
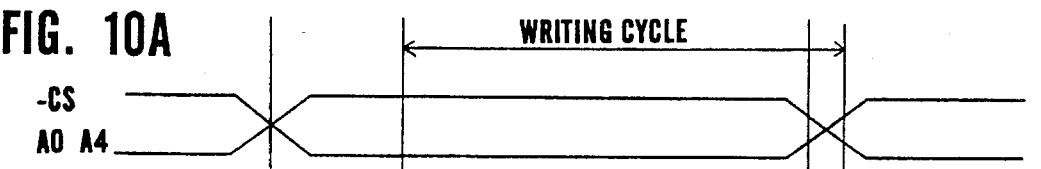
FIG. 10A
-CS
A0 A4
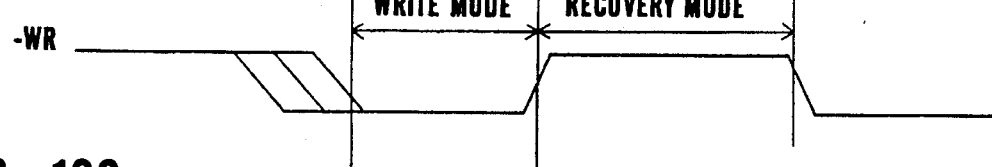
FIG. 10B
-WR
FIG. 10C
D0 D7
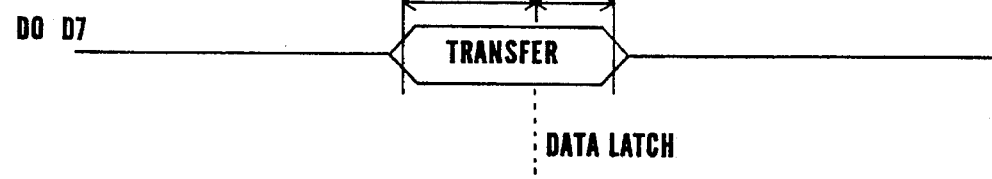

FIG. 13

| REG | AMP STEP | ATTEN STEP | SPEED (μS) | REG | AMP STEP | ATTEN STEP | SPEED (μS) |
|---|---|---|---|---|---|---|---|
| 00 | 0 | 0 | 2956.16 | 20 | 527 | 512 | 1.49 |
| 01 | 31 | 16 | 47.68 | 21 | 543 | 528 | " |
| 02 | 47 | 32 | 23.84 | 22 | 559 | 544 | " |
| 03 | 63 | 48 | " | 23 | 575 | 560 | " |
| 04 | 79 | 64 | 11.92 | 24 | 591 | 576 | " |
| 05 | 95 | 80 | " | 25 | 607 | 592 | " |
| 06 | 111 | 96 | " | 26 | 623 | 608 | " |
| 07 | 127 | 112 | " | 27 | 639 | 624 | " |
| 08 | 143 | 128 | 5.96 | 28 | 655 | 640 | " |
| 09 | 159 | 144 | " | 29 | 671 | 656 | " |
| 0A | 175 | 160 | " | 2A | 687 | 672 | " |
| 0B | 191 | 176 | " | 2B | 703 | 688 | " |
| 0C | 207 | 192 | " | 2C | 719 | 704 | " |
| 0D | 223 | 208 | " | 2D | 735 | 720 | " |
| 0E | 239 | 224 | " | 2E | 751 | 736 | " |
| 0F | 255 | 240 | " | 2F | 767 | 752 | " |
| 10 | 271 | 256 | 2.98 | 30 | 783 | 768 | " |
| 11 | 287 | 272 | " | 31 | 799 | 784 | " |
| 12 | 303 | 288 | " | 32 | 815 | 800 | " |
| 13 | 319 | 304 | " | 33 | 831 | 816 | " |
| 14 | 335 | 320 | " | 34 | 847 | 832 | " |
| 15 | 351 | 336 | " | 35 | 863 | 848 | " |
| 16 | 367 | 352 | " | 36 | 879 | 864 | " |
| 17 | 383 | 368 | " | 37 | 895 | 880 | " |
| 18 | 399 | 384 | " | 38 | 911 | 896 | " |
| 19 | 415 | 400 | " | 39 | 927 | 912 | " |
| 1A | 431 | 416 | " | 3A | 943 | 928 | " |
| 1B | 447 | 432 | " | 3B | 959 | 944 | " |
| 1C | 463 | 448 | " | 3C | 975 | 960 | " |
| 1D | 479 | 464 | " | 3D | 991 | 976 | " |
| 1E | 495 | 480 | " | 3E | 1007 | 992 | " |
| 1F | 511 | 496 | " | 3F | 1023 | 1023 | " |

# SOUND PROCESSING APPARATUS

BACKGROUND OF THE INVENTION

The present invention relates to a sound processing apparatus, and more particularly to a sound processing apparatus used in a game computer system.

Traditionally, in a computer system, sound is produced from waveform data, which is generated by a computer program based process; however, the quality of the sound has been low. For that reason, sound data (analog signals) now are converted into digital signals so that the sound waves may be synthesized by an arithmetic operation.

In general, a game computer use a programmable sound generator (PSG), which is small in size and capacity. In the PSG, wave data supplied by a CPU are modulated in amplitude or frequency in order to generate a sound wave. The PSG may generate simple waves to intentionally produce noise. According to the PSG, it is easy to control the output sound; however, it is difficult to generate a variety of sounds.

For A/D conversion, a pulse code modulation (PCM) method is used, by which an analog signal is sampled at predetermined intervals, the sampled data are quantized, and then, are transformed into binary data.

According to a difference PCM (DPCM) method, the difference of the next two sampled data is quantized so that the amount of output data is reduced. Further, according to an adaptive difference PCM (ADPCM) method, the quantizing process is performed at a short pitch when the next two sampled data have a great difference, and on the other hand, the process is performed at a long pitch when they have a small difference. As a result, the output data may be more compressed.

The PCM and ADPCM data are compatible with each other by compression and extension processing, which is performed based on conversion between scale value and scale level, and between the ADPCM data, the changing amount and changing level of the data.

In a game computer, ADPCM sound data stored in an extra recording device are read by a CPU, and the data are extended by an ADPCM decoder in accordance with a scale value and a scale level, so that the original sound is reproduced. The ADPCM decoder contains a synchronizing signal generating circuit, which generates a transmission rate using a crystal resonator. The PCM data are reproduced in accordance with the transmission rate.

Recently, the game computer has become provided not only with a sound source such as PSG and ADPCM controlled by the CPU, but also an external audio device to realize high quality sound reproduction. For example, in a game computer using a CD (compact disk) as recording medium, a CD player is directly used as the PCM sound source to generate high quality sound.

Generally, the sound data are controlled in volume by a volume control circuit, and output sound is supplied through a mixer circuit. Basically, two types of volume control circuits, analog and digital types, are used in game computers. According to the volume control circuit of the analog type, volume of output sound is controlled by a voltage signal. The volume control circuit of the digital type includes a D/A converter, in which a conversion ratio is changed for each bit. An attenuation amount (N) of a volume control circuit is given by the equation "$N(Db) = \log(I_1/I_0)$," where $I_1$ and $I_0$ represent levels of input and output signals, respectively. Most volume control circuits include registers holding values for specifying attenuation values of sound data.

FIG. 1 shows the relation between register values and attenuation values for a volume control circuit contained in a conventional sound processing apparatus. As shown in this table, an attenuation range of 12 dB is divided into eight levels, in which the first four values are set to have 1 dB differences from each other, and the last four values are set to have 2 dB differences from each other. The attenuation levels −1 dB, −2 dB, −3 dB, −4 dB, −6 dB, −8 dB, −10 dB and −12 dB correspond to register values 7, 6, 5, 4, 3, 2, 1 and 0, respectively.

In the conventional volume control circuit, the difference values of attenuation are not constant, because it is difficult to divide the total attenuation level (attenuation range) constantly, especially at the maximum and minimum levels. According to the conventional volume control circuit, the register values are determined to correspond to the attenuation levels one-to-one, and therefore, it is difficult for an operator to adjust the sound volume to desired levels.

A conventional game computer contains a sound source chip for sound processing. Most sound source chips include sound sources for generating sound, and volume control circuits for controlling volume of the sound supplied from the sound sources. The volume control circuits are structured to be adapted to the characteristics of sound to be reproduced and the performances of amplifiers, speakers and the like.

When an external volume control circuit is provided with the game computer to realize high performance sound processing, a controller circuit is required to be built in the system to control the external volume control circuit.

Recently, a plurality of sound sources are employed in a game computer to treat a variety of sound, to produce special sound and music effects. However, such a high performance system is expensive for a game computer, because plural volume control circuits having different performances must be controlled properly.

Generally, a plurality of sound sources, such as PSG and ADPCM, are contained in different sound chips individually, and output sound of the sound chips are also supplied to an external mixer circuit.

When an external sound source, such as a CD player with no volume controller, is employed in the system, an extra volume control circuit is necessary to be contained in the system to control volume of the player. As described above, when a plurality of sound sources are employed in a system, the circuitry in the system becomes complicated, and as a result, the cost of the system becomes high.

In the conventional game computer, volume and output controlling by the volume and mixer circuits are performed in accordance with values held in internal registers built in the volume control circuits, the register values being set by a CPU. According to the conventional system, the circuitry in the system becomes complicated because the CPU controls the sound chips individually.

SUMMARY OF THE INVENTION

Accordingly, it is an object of the present invention to provide a sound processing apparatus in which output volume may be adjusted to desired levels easily by operators.

It is another object of the present invention to provide a sound processing apparatus, which may be fabricated to have a simple structure even if an external sound source is employed therein.

It is still another object of the present invention to provide a sound processing apparatus, which may be fabricated to have a simple structure even if a plurality of sound sources are employed therein.

According to a first feature of the present invention, a sound processing apparatus includes a volume control circuit for controlling volume of output sound, and a register holding plural values specifying attenuation levels. The register values are determined to linearly correspond to the rate of change of the attenuation level.

According to a second feature of the present invention, a sound processing apparatus includes a sound source chip, a sound source in the chip for producing sound data, an external volume control circuit placed out of the sound source chip, and an internal controller circuit built in the sound source chip. The external volume control circuit is supplied with the sound data from the sound source to control volume of output sound. The internal controller circuit supplies a control signal to the external volume control circuit, and controls the output sound when the external volume control circuit does not operate.

According to a third feature of the present invention, a sound processing apparatus includes a sound source chip, and an external sound source for generating external sound data. The sound source chip contains an internal sound source generating internal sound data, and a mixer circuit for mixing the internal and external sound data to generate output sound.

According to a fourth feature of the present invention, a sound processing apparatus includes a sound source chip, and an external sound source for generating external sound data. The sound source chip contains an internal sound source generating internal sound data, a volume control circuit to which the internal and external sound data are supplied for controlling volume of output sound, and a mixer circuit to generate output sound in accordance with output data of the volume control circuit.

According to a fourth feature of the present invention, a sound processing apparatus includes a sound source chip that contains a plurality of sound sources each for generating sound data, and a sound reproducer for reproducing the sound data to supply output sound.

BRIEF DESCRIPTION OF THE DRAWINGS

FIG. 1 is a table showing a relation between values of a register and attenuation levels in a volume control circuit according to a conventional sound processing apparatus.

FIG. 4 is a table showing a relation between values of a register and attenuation levels in a volume control circuit according to the invention.

FIG. 5 is a diagram showing the contents of an operation register according to the invention.

FIG. 6 is a diagram showing the contents of a volume register according to the invention.

FIG. 7 is a diagram showing the contents of control registers according to the invention.

FIG. 8 is a diagram showing the contents of a PSG operation register according to the invention.

FIG. 9 is a table showing a relation between a register and addresses A0 to A3 of the PSG according to the invention.

FIG. 10 is a timing chart showing operation of the sound data output unit according to the invention.

FIG. 13 is a table showing interrelationships among register values, amplifier and attenuation steps, and adjusting speed, according to the invention.

DETAILED DESCRIPTION OF THE INVENTION

Figure 2:
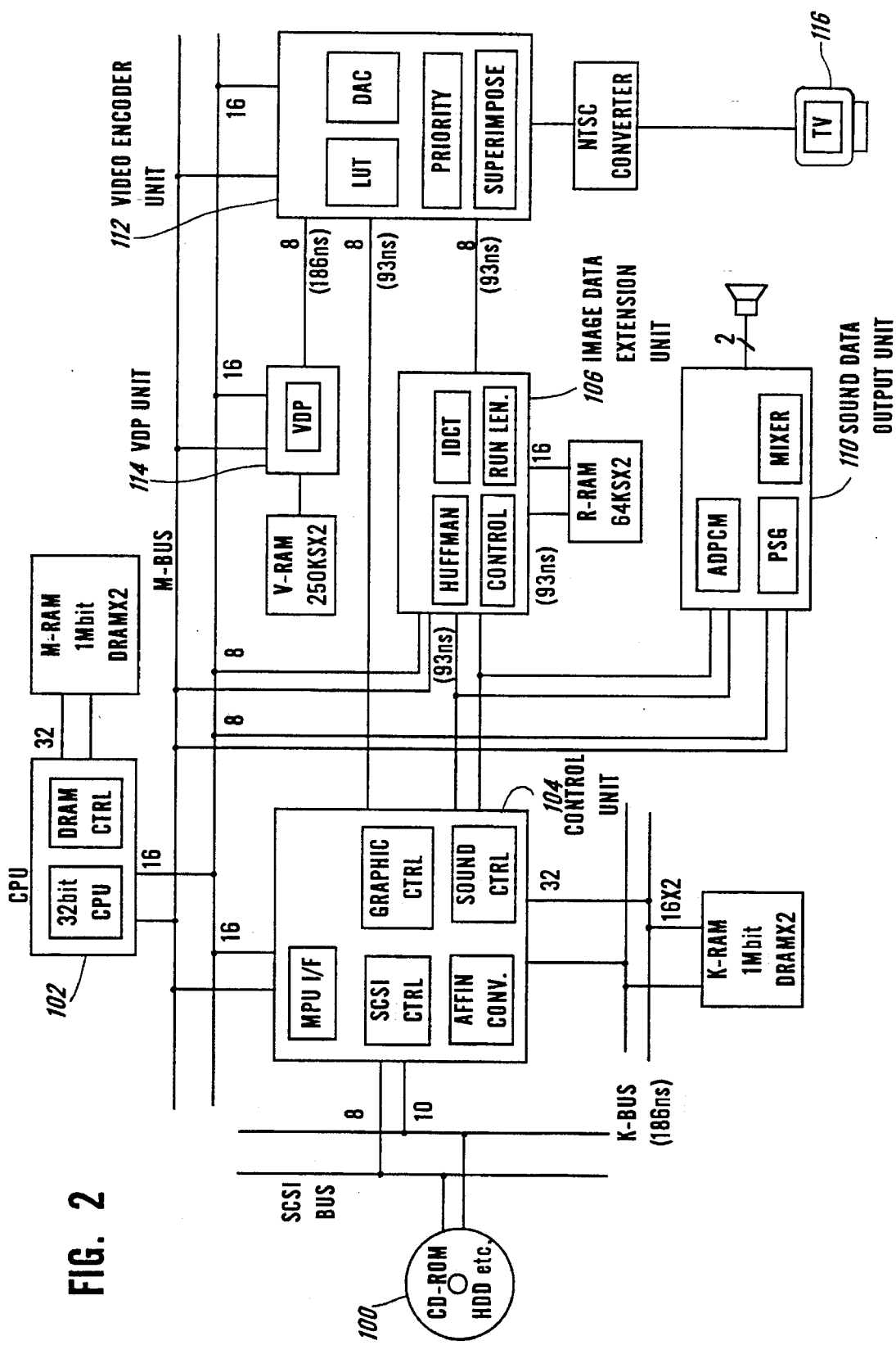
FIG. 2 is a block diagram showing a computer system using a sound processing apparatus according to the invention.

FIG. 2 shows a computer system, which includes a game-software recording medium 100 such as a CD-ROM, a CPU 102 of the 32-bit type, a control unit 104 for mainly controlling transmission of sound data and interfacing most devices to each other, an image data extension unit 106, an image data output unit, a sound data output unit 110, a video encoder unit 112, a VDP unit 114 and a TV display 116.

CPU 102, control unit 104, image data extension unit 106 and VDP unit 114 are provided with their own memories M-RAM, K-RAM, R-RAM and V-RAM, respectively.

Figure 3:
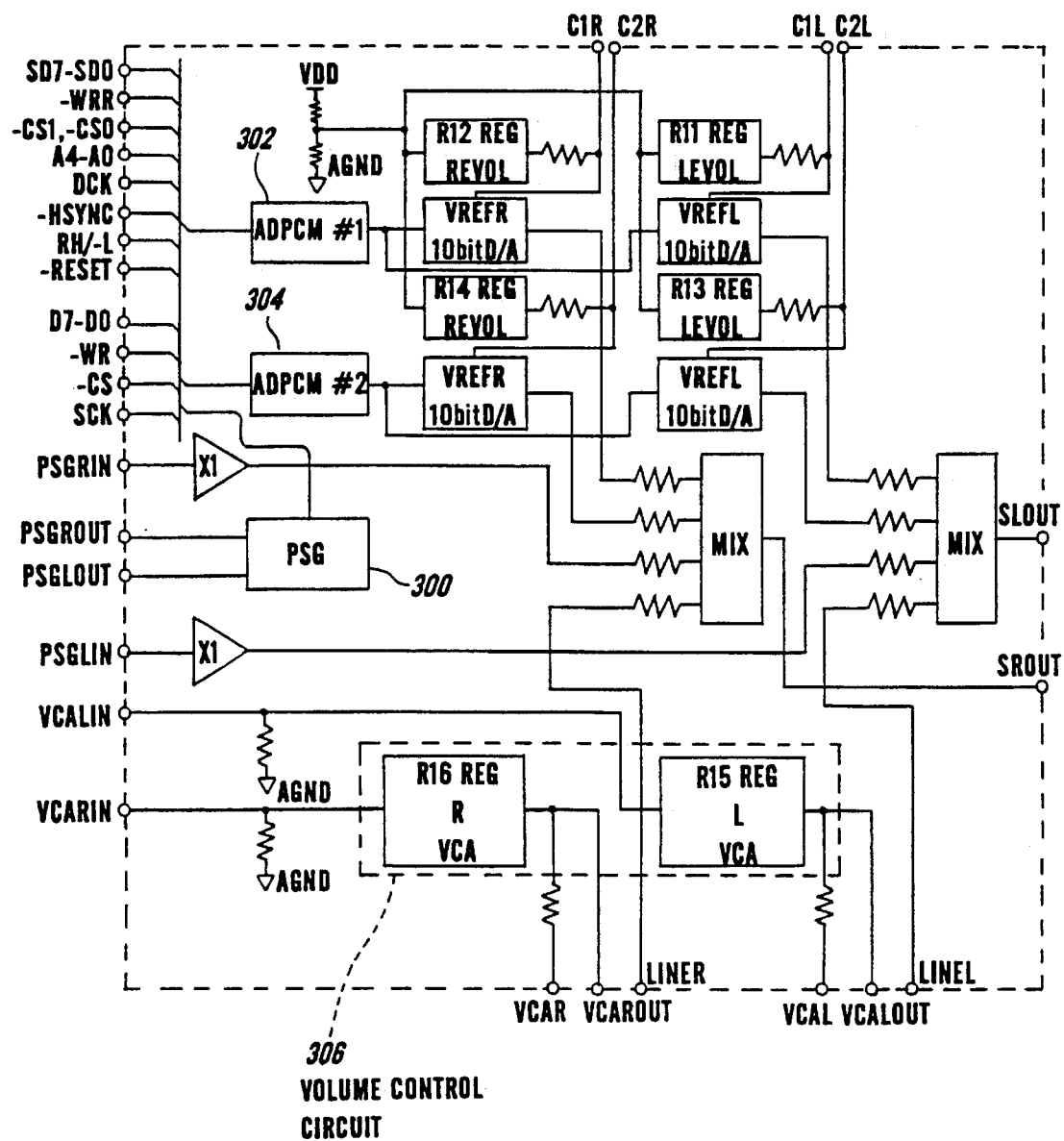
FIG. 3 is a block diagram showing a sound data output unit according to the invention.

FIG. 3 shows sound data output unit 110, shown in FIG. 2. The sound data output unit includes a 6 channel programmable sound generator (PSG) 300, right and left channels ADPCM decoders (#1 and #2) 302 and 304, a sound data output circuit to which sound data are supplied from the CD-ROM (external sound source), and a volume control circuit 306 for controlling output of the ADPCM decoder and PSG.

FIG. 4 shows a relation between values set in the volume register and attenuation values to be used. As shown in this table, an attenuation range of 12 dB is divided into eight levels, in which the first four values are set to have 1 dB differences from each other, and the last four values are set to have 2 dB differences from each other. The attenuation levels −1 dB, −2 dB, −3 dB, −4 dB, −6 dB, −8 dB, −10 dB and −12 dB correspond to register values 11, 10, 9, 8, 7 and 6, 5 and 4, 3 and 2, and 1 and 0, respectively. Each register value corresponds to 1 dB (changing rate). If the total attenuation values −10 dB and −12 dB are changed to −10 dB and −11 dB, register values 3 and 2, and 1 are set to correspond to the attenuation values of −10 dB and −11 dB, respectively.

According to the invention, it is easy for operators to adjust output volume to desired levels by their sense, because the register values linearly correspond to the relative difference value (1 dB) of attenuation levels. Especially, the invention is useful for music produced by a program, in which sound volume is required to be monitored in accordance with register values.

Sound data supplied from the ADPCM decoder are buffered in the K-RAM and are transmitted by the control unit. Basically, the ADPCM decoder uses a sampling frequency of 31.47 kHz; however, 15.73 kHz, 7.87 kHz and 3.98 kHz are available. The ADPCM sound data are defined by 4 bits, in which the first bit represents a code, and are transmitted for each byte.

In the computer system, sound volume and sampling frequency of the ADPCM decoder, soft-reset, and operation of the PSG are controlled by the CPU using registers.

The registers contained in the ADPCM decoder are now explained in conjunction with FIGS. 5 and 6.

FIG. 5 shows an operation register for specifying operations of the ADPCM decoder. A sampling frequency of the ADPCM decoder is specified using 2 bits.

FIG. 6 shows a volume register for specifying sound volume of the ADPCM decoder. Each channel of the ADPCM decoder is controlled in volume for right and left. When each of the registers D5 to D0 is set at "3F (hexa)," the maximum volume is obtained. One register value corresponds to an attenuation amount of −1.5 dB, and the register value "1C (hexa)" corresponds to the maximum attenuation amount −52.5 dB. When the register value is set at 1B to 00, no sound is obtained.

FIG. 7 shows control registers contained in the control unit for controlling the operation of the ADPCM decoder.

FIG. 7(1) shows a reproduction mode register for holding data that specify a sampling frequency and a start timing for data transmission.

FIG. 7(2) shows a data buffer control register for holding data that specify an interrupt operation and a condition of a memory storing sound data to be transmitted to the ADPCM decoders #1 and #2.

FIG. 7(3) shows a start address register for holding data that specify a start address of data to be read from the memory.

FIG. 7(4) shows an end address register for holding data that specify an end address of data to be read from the memory.

FIG. 7(5) shows a half address register for holding data that specify an address for an interrupt operation.

FIG. 7(6) shows a status register for holding data that specify conditions of data transmission from the ADPCM decoders.

The PSG employs a waveform memory system, by which waveforms are generated for each channel in accordance with the contents of a waveform register, a waveform of each period being formed by 5 bits×32 words.

FIG. 8 shows a register unit for holding data that specify the operations of the PSG.

FIG. 8(1) shows a channel select register R0 for holding data that specify a channel address.

FIG. 8(2) shows a main volume register R1 for holding data that specify the whole volume of sound generated by mixing sounds of all the channels. In response to LMAL and RMAL, left and right outputs are controlled, respectively. Each of the LMAL and RMAL is defined by 4 bits, and has the maximum volume when "F (hexa)" set thereat. A value 1 corresponds to an attenuation width of −3 dB.

FIG. 8(3) shows a register R2 for holding data that specify an amount for fine adjustment of a frequency.

FIG. 8(4) shows a register R3 for holding data that specify an amount for rough adjustment of the frequency, so that the output frequency is specified in accordance with values held in the last four bits of the registers (4) and in the register (3).

FIG. 8(5) shows a register R4 for holding data that specify the operation of the PSG. At the first bit, data for controlling output of the channel and writing operation of data to a waveform register R6 are held. At the second bit, data for controlling a direct D/A mode are held. When "1" is set at the first bit, output operation (mixing) of the sound of the channel is performed. When "0" is set at the first bit, no output sound is supplied, and data are able to be written into the waveform register R6. When "1" is set at the second bit, an address counter of the waveform register R6 is reset, and a data signal is directly supplied to a D/A converter. When "1F (hexa)" is set at the last 5 bits, the maximum volume is obtained. Each register value corresponds to an attenuation width of −3 dB.

FIG. 8(6) shows a volume register R5 for holding data that specify sound volume of the right and left channel. The first and last four bits LAL and RAL are used for sound volume of the left and right channels, respectively. When "F (hexa)" is set at LAL and RAL, the maximum volume is specified for the channel. Each register value corresponds to an attenuation width of −3 dB.

FIG. 8(7) shows the waveform register R6 for holding a waveform for one period of the channel. The register holds waveform data of 32 words (5 bit/word) for one channel.

FIG. 8(8) shows a register R7 for holding data that specify whether noise or music is selected to be used and a frequency of a clock signal to be supplied to a noise generator. The noise enable and noise frequency data are held at the first bit and the last five bits, respectively.

FIG. 8(9) shows a register R8 for holding data that specify a frequency of an LFO (Low Frequency Oscillator) for frequency modulation.

FIG. 8(10) shows a register R9 for holding data that specify whether the LFO is set or reset and a modulation degree of the frequency modulation using the LFO.

The registers shown in FIG. 8 are provided for each channel. The registers R2 to R7 are addressed by A0 to A3 and the register R0; however, the registers R0, R1, R8 and R9 are addressed only by A0 to A3.

FIG. 9 shows a relation between the registers R0 to R9 and the address values A0 to A3.

The PSG employs a dynamic range (D range) of 45 dB. Therefore, when the total amount of attenuation level of the register R1 (LMAL/RMAL), register R4 (AL) and register R5 (LAL/RAL) is less than −45 dB, no sound is reproduced because the amount −45 dB is in practice equivalent to −∞ dB.

The operations for writing data by the CPU into the registers, shown in FIGS. 7 and 8, are now explained in conjunction with FIG. 10.

FIG. 10 shows voltage levels at input terminals of the sound data output unit. In this figure, −CS, A0 to A4, −WR and D7 to D0 represent a chip select signal, a write address signal, a write signal and a data input signal, respectively. Input data are supplied from the CPU through the bus of D7 to D0 to the sound data output unit. In a write mode when the write signal −WR is low, data are written through D7 to D0 to the registers specified by the chip select and address signals from the CPU. Each time when the write signal −WR rises to a high level recovery mode (shown by broken line), the data are latched, and then the latched data become effective at the next falling edge of a sampling clock pulse. When data are written more than two times in one sampling period, the following data, which have been written just before the previous data, become effective.

Figure 11:
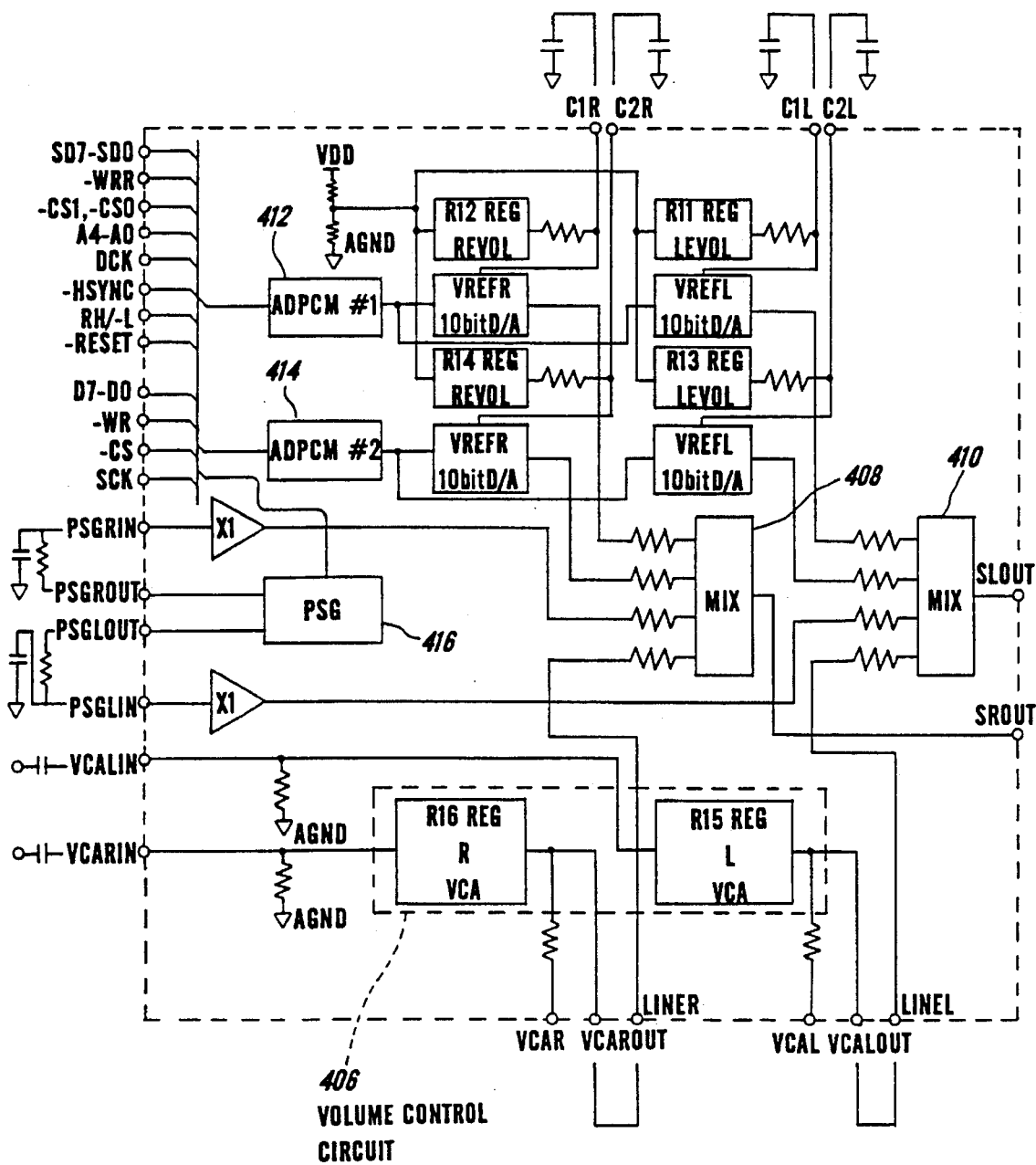
FIG. 11 is a block diagram showing a sound source chip with an internal volume control circuit according to the invention.

FIG. 11 shows a sound data output unit (sound source chip) of a second preferred embodiment. This unit includes a volume control circuit 406 containing right and left VCAs (Voltage Control type Amplifier), VCAR and VCAL, for controlling sound volume of the PCM sound signal supplied from the CD-ROM. The sound data output unit is provided with VCA input terminals VCARIN and VCALIN. The input terminals are connected to output terminals VCAROUT and VCAR, and VCALOUT and VCAL, respectively. The output terminals VCAROUT and VCALOUT are used when volume control circuit 406 is used as an internal volume control circuit. The output terminals VCAR and VCAL are connected to an external volume control circuit so that circuit 406 is used as a controller circuit.

In this embodiment, volume control circuit 406 is used as the internal volume control circuit, and therefore, the output terminals VCAROUT and VCALOUT are connected through terminals LINER and LINEL to mixer circuits 408 and 410, respectively. In this unit, four sound signals are supplied from two channels of ADPCMs 412 and 414 and six channels of PSG 416 and PCM to each mixer circuit. The VCAs include volume registers R15 and R16 for specifying an attenuation level to control output sound volume.

Figure 12:
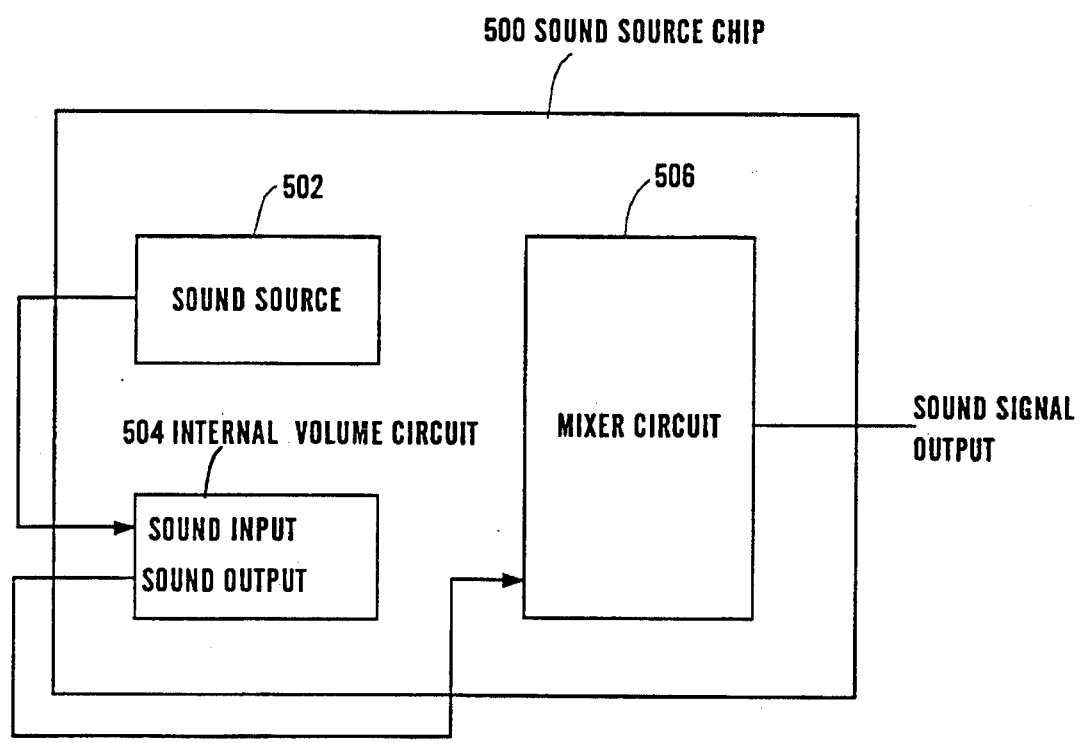
FIG. 12 is a conceptual view showing an example of the sound source chip according to the invention.

FIG. 12 shows a sound source chip 500 of the second preferred embodiment, which is a conceptual view of the sound data output unit shown in FIG. 11. The sound source chip includes a sound source 502, an internal volume control circuit 504 and a mixer circuit 506. Other sound sources, and other volume control circuits for plural sound sources, may be contained in the sound source chip.

FIG. 13 shows the characteristics of the VCA, register values, amplifier and attenuation steps, and adjusting speed. Output of the unit shown in FIG. 11 having the characteristics shown in FIG. 13 is now explained.

When the register is rewritten "3F" to "00", the volume level is changed by "20 log (0/1023)=−∞ dB", and the necessary time T is given by the following equation.

$$T=1.49\times512+2.98\times256+5.96\times128+11.92\times64+23.84\times32+47.68\times16+ 2956.16=7.53 \ ms$$

When the register is rewritten "3D" to "3F", the volume level is changed by "20 log (1023/991)=0.27 dB", and the necessary time T becomes 47.68 μs=49×(1023−991).

Figure 14:
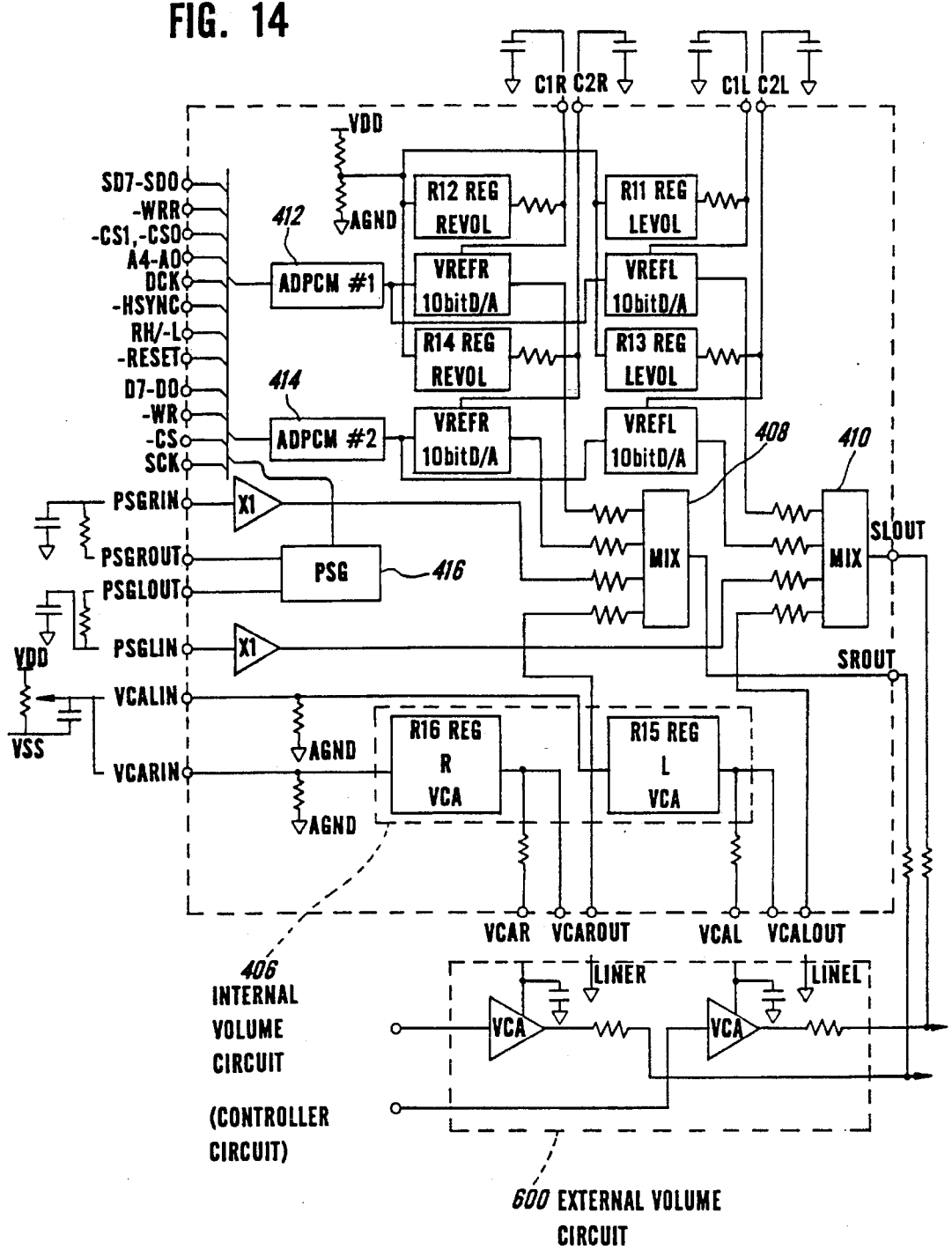
FIG. 14 is a block diagram showing a sound source chip with an external volume control circuit according to the invention.

FIG. 14 shows a sound source chip (sound data output unit) according to a third preferred embodiment. This unit has the same structure as that of the second preferred embodiment shown in FIG. 11; however, an internal volume control circuit 406 operates as a controller circuit to control an external volume control circuit 600. External volume control circuit 600 is connected through VCAR and VCAL terminals to the internal volume control circuit, so that volume registers R15 and R16 are rewritten in accordance with direct voltage signals supplied to the VCA input terminals VCARIN and VCALIN. In response to the direct voltage signals, control voltage signals are generated to be supplied to the external volume control circuit. The external volume control circuit supplies sound data which have been controlled in volume to the mixer circuits.

Figure 15:
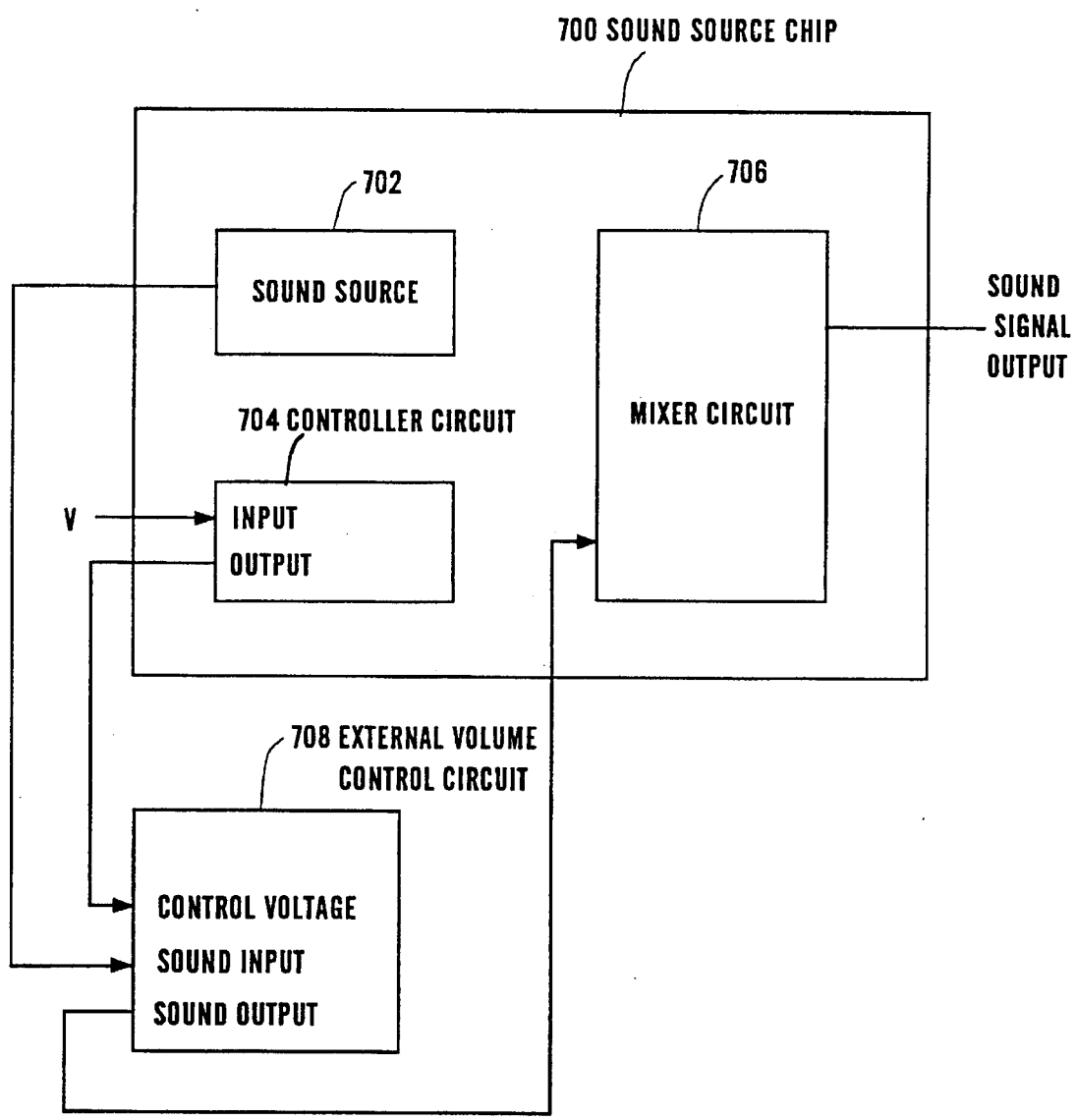
FIGS. 15 to 17 are conceptual views showing other examples of the sound source chip according to the invention.

FIG. 15 shows a sound source chip 700 of the third preferred embodiment, which is a conceptual view of the sound data output unit shown in FIG. 14. The sound source chip includes a sound source 702, a controller circuit (internal volume control circuit) 704, and a mixer circuit 706 connected to an external volume control circuit 708.

How to obtain the control voltage when the unit shown in FIG. 14 has the characteristics, shown in FIG. 13, is now explained. When 1.0 V voltage is applied to analog ground, and the register is rewritten "3D" to "3F", the output voltage V and necessary time T are given by the following equations.

$$V=-1\times1023/991=-1.032 \ V \text{ (analog ground)}$$

$$T=1.49\times(1023-991)=47.68 \ \mu s$$

As described before, according to the second and third preferred embodiments, the internal volume control circuit is used as either the volume control circuit or controller circuit for the external volume control circuit. Therefore, when the external volume control circuit is employed, an extra controller circuit is not necessary. Further, the internal mixer circuits also operate for the external volume control circuit, and as a result, internal and external sound may be mixed to generate output sound.

Figure 16:
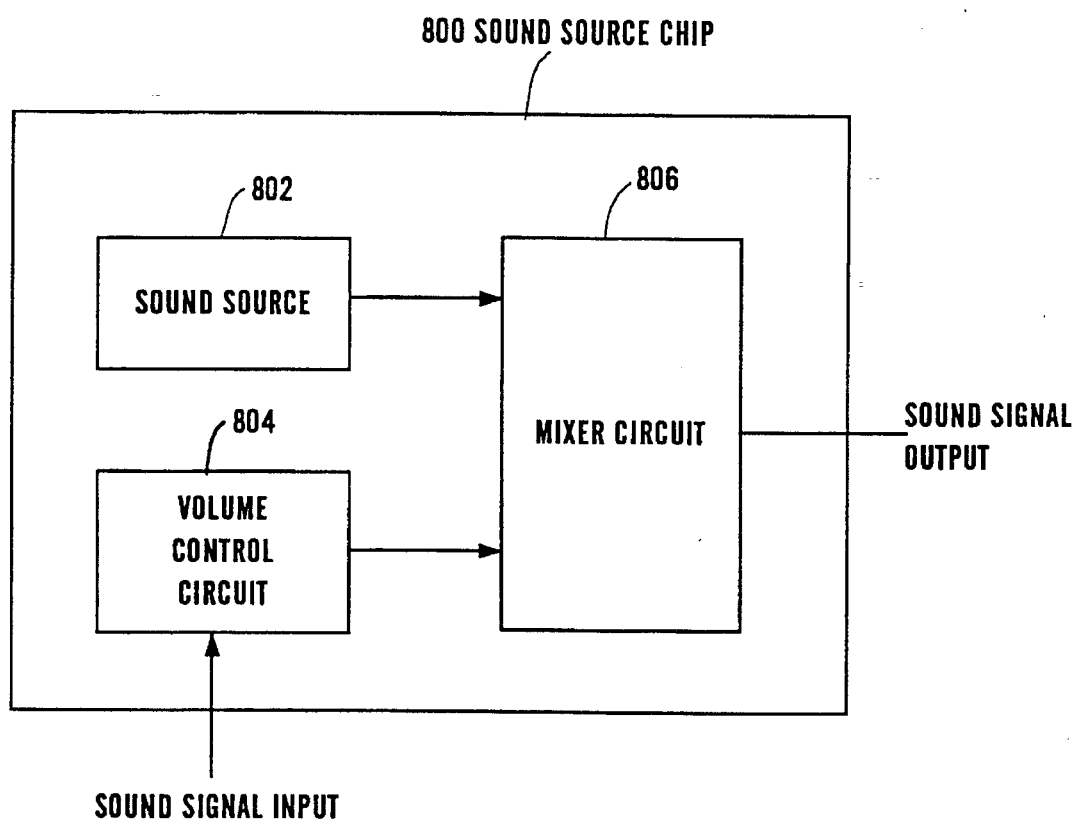

FIG. 16 shows a sound source chip 800 of a fourth preferred embodiment. The sound source chip includes a sound source 802, a volume control circuit 804 connected to an external sound source (not shown), and a mixer circuit 806. Other sound sources, and other volume control circuits for plural sound sources may be contained in the sound source chip. If the volume control circuit is not necessary, a sound signal from the external sound source is supplied to the mixer circuit directly.

The mixer circuit contains not only an internal mixer that mixes sound from a multi-channel sound source, but also a mixer that mixes sound from a variety of sound sources.

Figure 17:
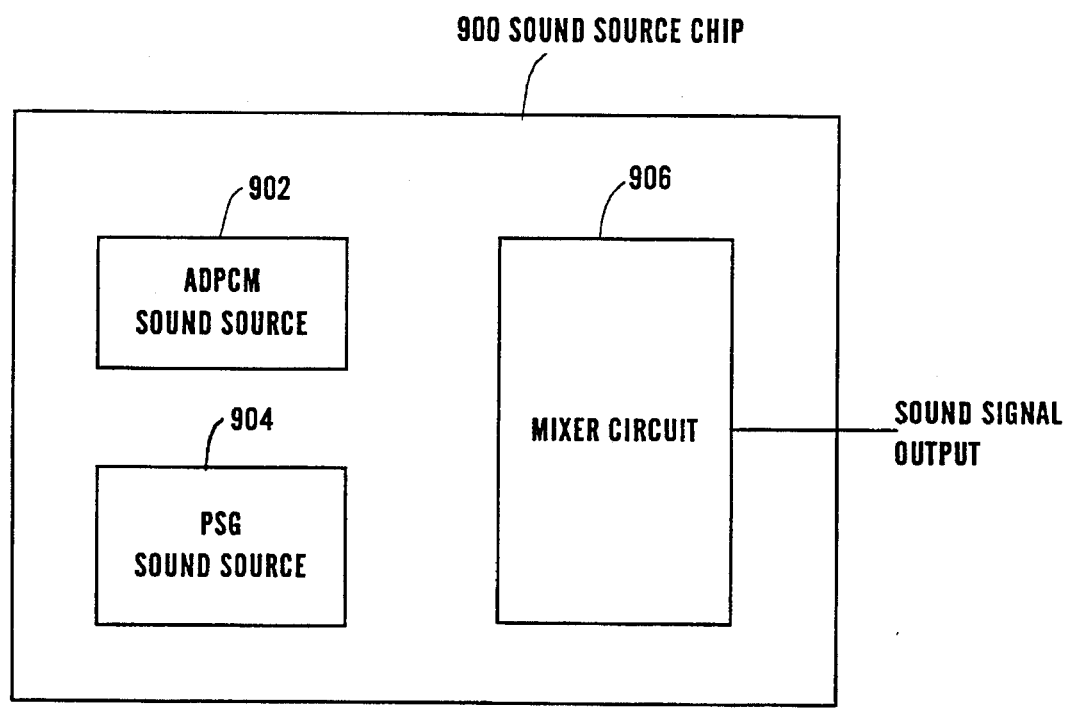

FIG. 17 shows a sound source chip 900 of a fifth preferred embodiment. The sound source chip includes an ADPCM sound source 902, a PSG sound source 904, and a mixer circuit 906. Other sound sources, and volume control circuits, and two channel mixer circuits may be contained in the sound source chip.

As described before, according to the invention, an extra external mixer circuit is not necessary, because a plurality of sound sources such as PSG and ADPCM are connected to the internal mixer circuits. Further, it easy to control the sound data output unit by the CPU, because the registers for controlling sound output are contained in one chip.

I claim:

1. A sound processing apparatus, which contains a sound source chip, comprising:

a sound source within the sound source chip for producing sound data;

an external volume control circuit, which is placed out of the sound source chip, and is supplied with the sound data from said sound source to control volume of output sound; and an internal controller circuit, which is built in the sound source chip, for supplying a control signal to said external volume control circuit, and for controlling the output sound when said external volume control circuit does not operate.

2. The sound processing apparatus, according to claim 1, wherein:

said sound source electrically produces sound by programming.

3. The sound processing apparatus, according to claim 1, wherein:

said sound source is composed of a plurality of sound source circuits.

4. The sound processing apparatus, according to claim 3, wherein:

said plurality of sound source circuits comprise a PSG (Programmable Sound Generator) and an ADPCM (Adaptive Difference Pulse Code Modulation) decoder.

5. A sound processing apparatus, comprising:

a sound source chip including an internal sound source for producing sound data;

an external volume control circuit arranged apart from said sound source chip and responsive to said sound data from said internal sound source, for controlling the volume of output sound; and an internal volume control circuit arranged within the sound source chip for supplying a control signal to said external volume control circuit, and for controlling the volume of output sound when said external volume control circuit does not operate, said internal volume control circuit including, a plurality of registers, each storing at least one register value representing an amplifier and attenuation step.

6. The sound processing apparatus of claim 5, wherein said plurality of registers include:

a first register for controlling a right audio channel, and a second register for controlling a left audio channel.

7. The sound processing apparatus of claim 5, further comprising:

an external sound source, arranged apart from the sound source chip and coupled to said external volume control circuit, for generating external sound data;

a mixer circuit, arranged within the sound source chip and connected to said external volume control circuit, for mixing internal and external sound to generate output sound.

8. The sound processing apparatus of claim 5, further comprising:

and external sound source, arranged apart from said sound source chip for generating sound source data;

wherein, when said external volume control circuit does not operate, said internal volume control circuit receives said external sound data for controlling the volume of output sound, and a mixer circuit generates output sound in accordance with output data of said internal volume control circuit.

9. The sound processing apparatus, according to claim 5, wherein:

said internal sound source is composed of a plurality of sound source circuits.

10. The sound processing apparatus, according to claim 9, wherein:

said plurality of sound source circuits comprise a PSG (Programmable Sound Generator) and an ADPCM (Adaptive Difference Pulse Code Modulation) decoder.

* * * * *